Dec. 26, 1950        R. K. NOTTINGHAM        2,535,153
SELF-ALIGNING LATCHING DEVICE
Filed July 7, 1947        3 Sheets-Sheet 1
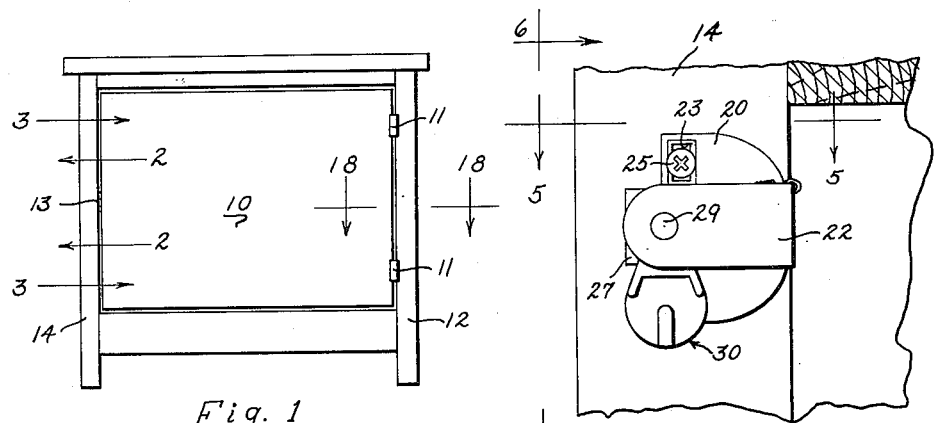
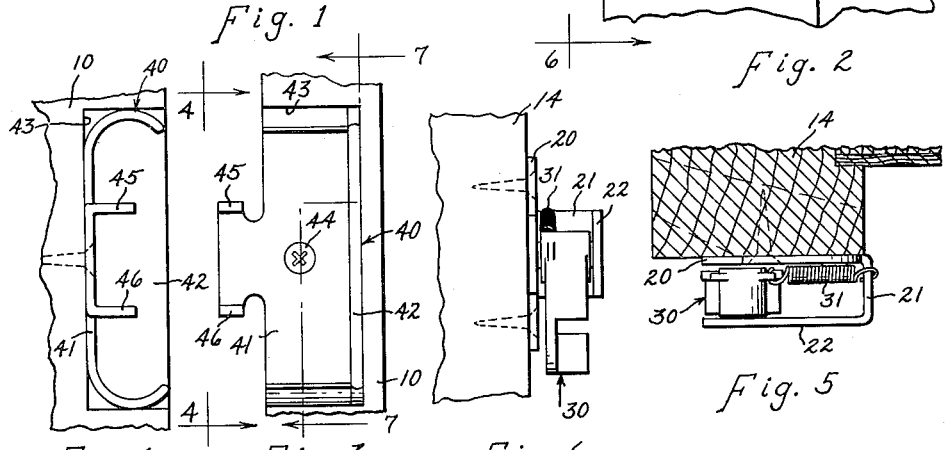
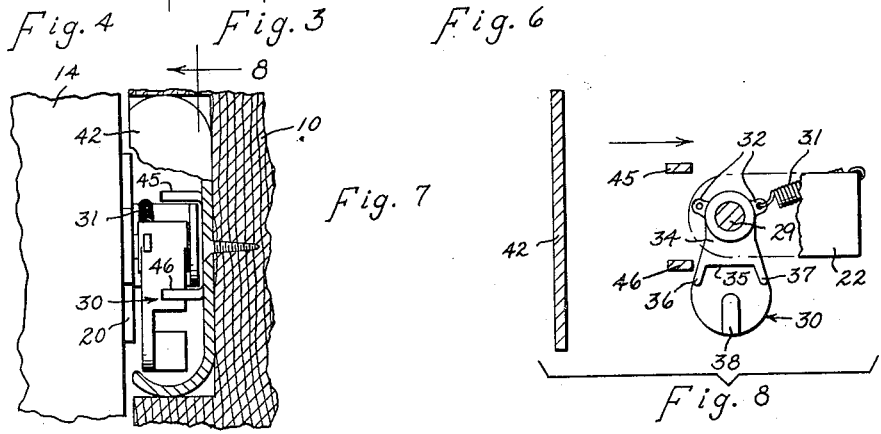
INVENTOR.
Ralph K. Nottingham
BY
        Attorney INVENTOR.
Ralph K. Nottingham
BY
Attorney

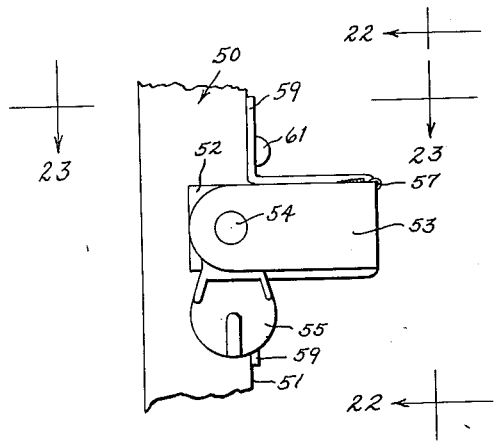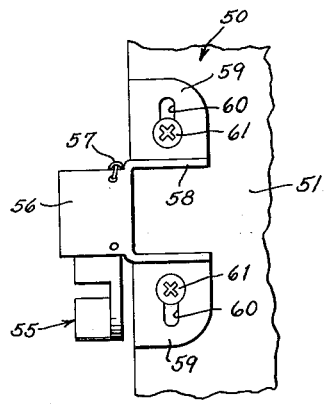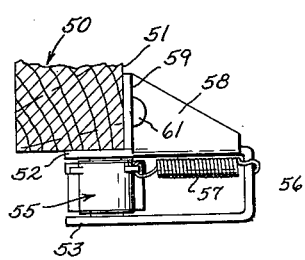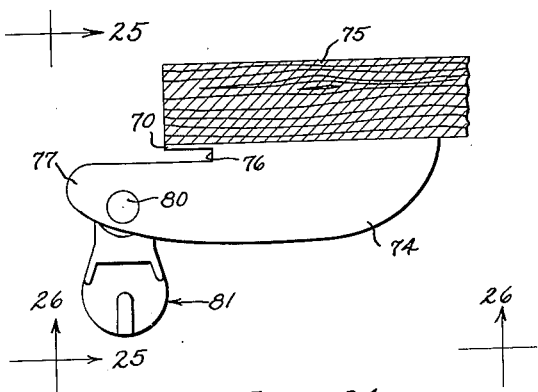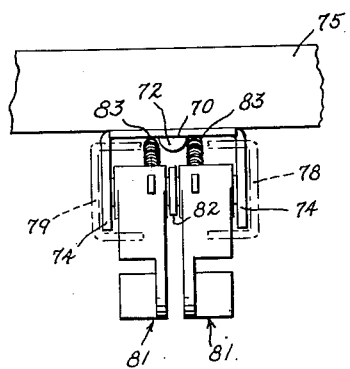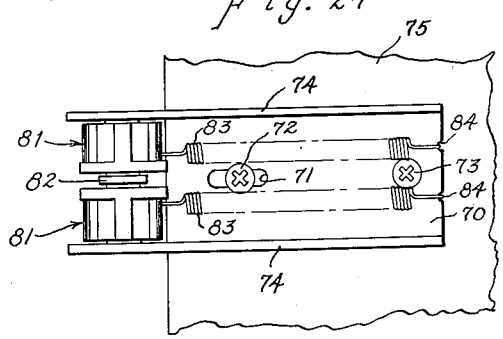

Patented Dec. 26, 1950

2,535,153

UNITED STATES PATENT OFFICE 2,535,153

SELF-ALIGNING LATCHING DEVICE

Ralph K. Nottingham, Portland, Oreg., assignor to Phillips Tutch-Latch Company, New York, N. Y., a corporation of Delaware Application July 7, 1947, Serial No. 759,326

7 Claims. (Cl. 292—341.17)

My present invention relates to latching devices such as may be suitable for use in connection with doors, drawers, windows, cabinets and the like.

The present invention comprises an improvement upon the device illustrated, described and claimed in my co-pending application, Serial No. 689,887, filed August 12, 1946.

It is a primary object of the present invention to provide a new and improved latching device which may be mounted, for example, on a cabinet door, and which is operable solely in response to pressure exerted against the front side of the door. The latching device is entirely concealed, with no portions thereof protruding from or visible from the front side of the door. The door is automatically latched in the closed position upon closing movement of the door, and is automatically unlatched merely by exerting a further slight inward pressure against the front surface of the door.

Another object of the present invention is to provide a new and improved latching device of the class described which is effective for retaining the door in closed position irrespective of the force or speed with which the door may be closed.

A still further object of the present invention is to provide a new and improved latching device of the type described which comprises a minimum number of movable parts, all of the parts of the device being of simple design and of low cost manufacture.

A further principal object of the present invention is to provide a latching device of the type described which may be mounted in any position, thus greatly increasing the utility of the device over that disclosed in my previously filed application identified above.

A further object of the improved form of device is to provide a latching device including a keeper as described in the previous application, which keeper is tensioned to return to a neutral position by spring means, thus making the latching device more positive in action and eliminating any chance of the device failing to operate, and permitting the mounting of the device in any angular relationship with respect to the horizontal. For example, the keeper may depend from its pivot, or may extend vertically upward from its pivot, or may lie in a horizontal plane, or in any other position since the keeper is no longer actuated by the force of gravity.

A further and very important object of the improvement is in providing means for aligning one element of the latching device, such as the element on a door, with the other element of the latching device, such as the element mounted on a cabinet wall or shelf, in positive fashion so that the device cannot be jiggled or vibrated from latching to non-latching position.

A further important object of the present invention is to provide positive means for arresting the closing movement of a movable part, such as a cabinet door, when the parts are brought together sufficiently to position the latching elements in latching position, so that each closing movement is caused positively to result in a latching operation.

A further important object of the present improvement is to provide means whereby the shock of a slammed door may be taken up by the mounting of the latching device rather than any element of the latch parts, thus eliminating possible failures due to breakage or bending of small parts.

A further object of the present invention is to provide spring tensioning means for the keeper of such a device, which spring tensioning means exerts a pressure between the keeper journal and the keeper supporting pivot when in neutral position so as to prevent rattling of the keeper against its pivot or support. This is particularly important in radio or phonograph cabinets wherein some vibrations produced by the speaker, or otherwise produced as in sympathy with current oscillations, may cause loose objects to rattle in an annoying manner.

A further object of the present invention is to provide a device of the character described in which the spring for tensioning the keeper to neutral position may be placed in either one of several positions so as to permit reversibility of the neutral position of the keeper, thus permitting right or left hand mounting, or mounting in close corners at top or bottom of a cabinet.

A further object of the present invention is to provide means whereby the initial mounting of the elements of the latching device upon the door and cabinet may be easily accomplished, including means whereby a trial positioning may be accomplished and the final positioning accurately determined by causing the door to close at least once to self-align the several members, after which the members may be permanently fixed in their self-aligned positions.

A further object of the present improvement is to provide self-aligning means for the separable parts of the latching device of such character that a sagging door will be automatically drawn to its correct position upon closing thereof and will be held in correct position regardless of the looseness of the hinges or warping of door members, as long as the door may be closed at all.

A further object of the present invention is to provide such a device, which without changing the character of the latching parts may be supplied in a number of styles of mounting plates so that the latching device may be mounted upon various types of frames, stiles, mullions, shelves or the like.

A further object of the present invention is to provide a latching device of such character that a pair of keepers may be mounted closely together so that a cabinet having double doors without a stile therebetween may be provided with the device, the invention being such that either door may be opened without affecting the other, or, if desired, both doors may be opened simultaneously.

The general purpose of the present invention is to streamline and modernize cabinets, such as kitchen cabinets, freezer cabinets, radio and phonograph cabinets, refrigerators, utility chests, glove compartments and all other modern contrivances of the same general type so as to permit the use of flush doors without protruding handles, etc., and to lighten housework by providing doors which may be opened by pressure of the hands, elbows, knees, or any other part of the body when the operator's hands are full.

The foregoing and other objects and advantages of the invention will appear from the following description taken in connection with the accompanying drawings, wherein like numerals refer to like parts throughout, while the features of novelty will be pointed out with greater particularity in the appended claims.

In the drawings Fig. 1 is a front elevation illustrating a cabinet with a flush type door equipped with a latching device of the present invention;

Fig. 2 is a front elevation of one portion of the latching device of the present invention and taken along line 2—2 of Fig. 1;

Fig. 3 is a front elevation illustrating the other portion of the latching device and taken along line 3—3 of Fig. 1;

Fig. 4 is a side elevation taken along line 4—4 of Fig. 3;

Fig. 5 is a plan view taken along line 5—5 of Fig. 2;

Fig. 6 is a side elevation taken along line 6—6 of Fig. 2;

Fig. 7 is a sectional view taken substantially along line 7—7 of Fig. 3 and illustrating the parts in their relative position when the door is almost closed;

Fig. 8 is a sectional view taken along line 8—8 of Fig. 7;

Figure 19:
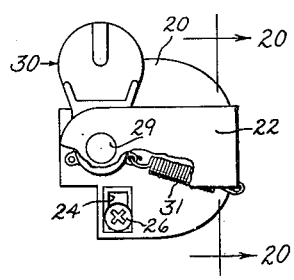
Figure 20:
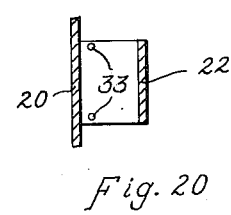

Figs. 9 to 17 inclusive are views similar to Fig. 8 illustrating successive stages in the operation of latching and unlatching the door;

Fig. 18 is a vertical section taken along line 18—18 of Fig. 1;

Fig. 19 is a view similar to Fig. 8 illustrating the reversibility of the spring and keeper;

Fig. 20 is a sectional view taken substantially along line 20—20 of Fig. 19;

Fig. 21 is a front elevation of a modified keeper part showing a different mounting therefor;

Fig. 22 is a side elevation taken substantially along line 22—22 of Fig. 21;

Fig. 23 is a plan view taken substantially along line 23—23 of Fig. 21;

Fig. 24 is a side elevation of a dual mounting;

Fig. 25 is a front elevation taken along line 25—25 of Fig. 24; and

Fig. 26 is a bottom view taken along line 26—26 of Fig. 24.

Referring to Figs. 1 to 18 inclusive the latching device of the invention will be described as it may be mounted in a cabinet. It will become apparent, however, as the description proceeds that the latching device may be used in connection with other constructions in which it is desired to latch a movable member in any limit position relative to a stationary member. The cabinet shown in Fig. 1 comprises a movable member or door 10 connected by hinges 11 to one corner post 12, the door being of the flush type and adapted to be held closed by a latching device, the cooperating parts of which are mounted at 13 on the free edge of the door and the other front corner post 14. The crack around the door is exaggerated for purposes of illustration and the device could be mounted so that no part would show as at 13. There is no part of the latching device projecting from the other surface of the cabinet and it is wholly concealed from view from the front side of the cabinet. No knob, handle, pull or push member is required so that there is no hardware fixture extending from the front surface to interfere with dusting, polishing or cleansing the outer surface of the cabinet. The door is biased outwardly, at least when in closed or partially closed condition, by any suitable spring means such as the button spring unit 15 sunk into the hinged edge of the door as shown in Fig. 18. Spring bias means of any other type may be equally well incorporated in the hinges or on the door or cabinet portions as desired.

The latching device of the present invention consists essentially of two separable parts, a latch part and a keeper part, one of which is adapted to be mounted on one of the relatively movable cabinet members while the other is mounted on the other cabinet member. As illustrated in Figs. 2 and 3 the keeper part is preferably mounted upon the stationary cabinet while the latch part is mounted upon the door, but the position of the parts could be reversed if desired.

As illustrated in Figs. 2, 5 and 6 the keeper part comprises a stamped and shaped sheet metal member consisting of a base portion 20, a rear connecting portion 21, and an outer portion 22 extending forwardly parallel to the base portion 20. The base portion 20 is of considerable width and is provided with a pair of countersunk slots 23 (Fig. 2) and 24 (Fig. 19), the longitudinal axes of which are preferably in line normal to the longitudinal axis of the front part 22. A screw 25 may be positioned centrally of slot 23 and tightened to considerable extent to hold the keeper part in tentative position. By closing the door carrying the latch part it will be seen later that the latch part may cause vertical shifting of the keeper part as permitted by the slot 23. Thereafter the members may be separated and screw 25 tightened and a screw 26 inserted through slot 24 in such position as firmly to hold the keeper part in adjusted position. The forward edge of the base portion 20 is preferably provided with a projecting abutment 27 extending forward to the same extent as the tip of the upper portion 22, and the tip of portion 22 is preferably rounded as illustrated. A pivot 29 of sturdy dimensions is mounted between the forward end of the upper portion 22 and the base portion 20, being preferably provided with shoulders (not shown) to hold the free end of portion 22 at the desired spacing, and the ends of the pivot 29 are preferably peened or punched to lock the pivot in position.

A keeper generally indicated at 30 is journalled upon the pivot 29. The keeper is generally elongate in shape so that it would depend vertically downward from the pin 29 in its neutral position as shown in Fig. 2; however, an improvement in this application over that previously disclosed in the above identified application is in the provision of a tension spring 31 which is hooked into one of a pair of ears 32 (Fig. 8) at one end and one of a pair of holes 33 in the connecting portion 21 adjacent the base portion 20 (Fig. 20). The ears 32 and the holes 33 are so positioned that when the spring 31 is tensioned therebetween the keeper 30 will extend transversely of the longitudinal axis of the upper portion 22. If the spring is positioned as illustrated in Fig. 8 the keeper 30 will be dependent from the pivot in neutral position, and if the spring is reversed as illustrated in Fig. 19 the keeper will extend upwardly from the pivot. It is a feature of the present invention that the latch device operates exactly the same in either position so that the keeper part may be mounted in a bottom corner or a top corner along a side wall, or may be mounted adjacent a left wall as illustrated in Fig. 1 for a right-hinged door, or reversed to be mounted adjacent the right wall for an oppositely hinged door. As seen in Fig. 5 the spring 31 extends closely above the bottom portion 20 so as not to interfere with portions of the latching part illustrated in Fig. 3.

While the keeper 30 may be machined, it is preferred for greater economy of manufacture to die-cast it of suitable metal alloy. Since no great shock is transmitted to the keeper it may be formed of any of the common, easily cast, relatively soft alloys. The keeper comprises a generally pear-shaped back portion which is positioned adjacent the mounting portion 20, an outstanding boss 34 having symmetrical front and rear sides and defining an abutment shoulder 35 facing away from the pivot 29, a lip 36 at one side of the shoulder, and a lip 37 at the other side thereof, both lips extending toward the outer end of the keeper. A stop abutment 38 rises from the outer end of the keeper, being centrally aligned with the pivot 29 so as to bisect the angle between the lips 36 and 37 and terminating at its inner end a spaced distance from the shoulder abutment 35, the arrangement being such that a passage of some width exists between the stop abutment 38 and the shoulder abutment 35 and lips 36 and 37.

The latch member illustrated in Figs. 3 and 4 consists of a metal stamping generally indicated at 40 and including a base portion 41 and a right angularly extending limit portion 42. The ends of the limit portion 42 are preferably rounded and the ends of the base portion 41 are preferably curved upwardly to lie adjacent the rounded ends of the limit portion 42 so that the maximum length of the latch portion occurs at rounded surfaces in order that it may be forced into a mortise opening 43 provided in the edge of the door 10, with the limit portion 42 braced against the outer surface of the mortise opening.

Preferably the innermost edge of the base portion 41 is flush with the inner surface of the door 10 and a countersunk opening therein is provided for the reception of a retaining screw 44 extending longitudinally of the door. Integral with an extension of the base portion 41 there is provided a pair of outwardly extending prongs 45 and 46 extending at right angles to the base portion and spaced from each other a distance such that they may embrace the parallel side edges of the upper portion 22 of the keeper part mounted upon the cabinet. As seen in Fig. 7 the prongs 45 and 46 are of such length as to contact the bosses on the keeper 30 but not the body thereof nor the spring 31. The upper portion 22 therefore serves as a self-aligning guide and the rounded front edge thereof will cause the free end of the door to be raised or lowered into proper alignment in case the door should start to sag or spring. Another function of the guiding portion 22 is to positively position the prongs with respect to the keeper so as to provide positive latching action. The prongs 45 and 46 extend in vertical planes parallel with a vertical plane through the pivot 29 and are symmetrically spaced above and below the horizontal plane of the pivot 29. When the keeper is mounted in depending fashion as illustrated in Fig. 8 the prong 46 acts as a latch and the prong 45 functions only as a guide; but if the keeper should be reversed as illustrated in Fig. 19, the prong 45 acts as a latch and the prong 46 serves only as a guiding and aligning member.

Figure 9:
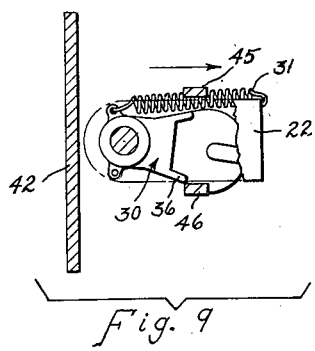
Figure 10:
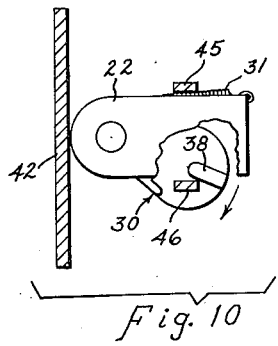
Figure 11:
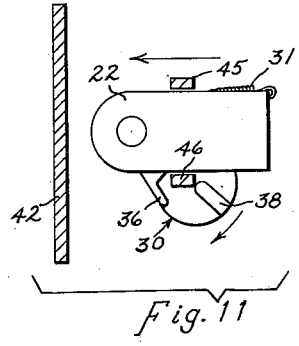
Figure 12:
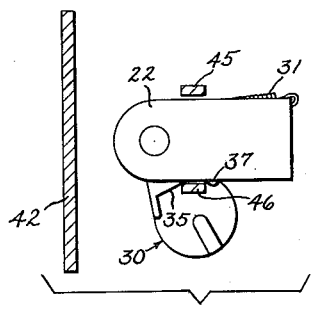

Referring now particularly to Figs. 7 to 17 inclusive the mode of operation of the latching device of the present invention will be described. Fig. 7 illustrates the general alignment of the parts in front elevation, and Figs. 8 to 17 inclusive in side elevation with various parts broken away to illustrate the action. Particular attention is directed in Fig. 8 to the fact that the inner surface of latch 46 is closer to a longitudinal line through the pivot 29 than the abutment shoulder 35 of the keeper. As the cabinet door is moved to closed position the latch 46 will bear against the forward lip 36 and cause the keeper to swing inwardly about its pivot axis, thus tensioning the spring 31 as seen in Fig. 9. As soon as the latch 46 clears the lip 36 the spring 31 will snap the keeper back until the stop abutment 38 prevents further movement thereof (Fig. 10). At this point the limit surface 42 of the latch part strikes the rounded end of the guiding portion 22 so as to limit further inward movement of the door, even though it may be pushed or slammed. The door is now moved slightly outward as illustrated in Fig. 11 due to the force of the spring button 15 and in so doing causes the latch 46 to enter the passage between the stop abutment 38 and the shoulder abutment 35. The spring 31 continues to exert pressure against the keeper causing it come to rest as retained by the latch 46 which is held in the angle between the stop abutment 35 and the lip 37. The continued outward pressure of the spring button device 15 causes the door to remain in latched position as illustrated in Fig. 12.

Figure 13:
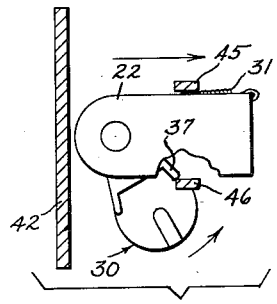
Figure 14:
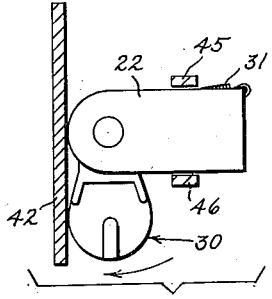
Figure 15:
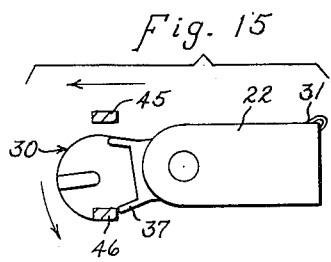
Figure 16:
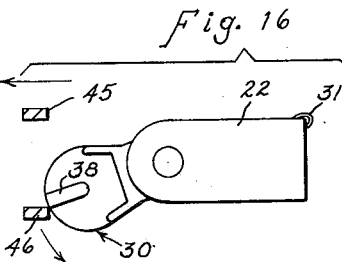
Figure 17:
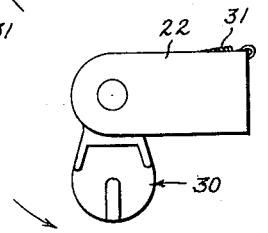

To release the door slight inward pressure thereon until the limit portion 42 strikes the rounded end of the guiding portion 22 will cause the latch 46 to swing the keeper slightly inward as illustrated in Fig. 13 until it clears the inner lip 37, whereupon the spring 31 will move the keeper to neutral position as illustrated in Fig. 14. Removal of pressure from the outer surface of the door permits the spring pin device 15 to spring the door outward, the latch 46 first riding on the outer surface of the lip 37 (Fig. 15), then on the stop abutment 38 (Fig. 16), the keeper swinging outward to permit such movement. After the latch has entirely cleared, the keeper is returned by the tension of spring 31 which, having passed over center, now positively returns the keeper to neutral position as illustrated in Fig. 17.

Figs. 21 to 23 inclusive illustrate an example of numerous modifications which the mounting member for the keeper may assume in order that the keeper may be mounted upon various types of shelves or the like. In this modification, the mounting member has been so formed as to adapt the device for use in connection with a narrow stile, mullion, shelf or corner post, such as exemplified by the member 50. It will be seen from the position of the screw holes in the form illustrated in Fig. 2 that the screws would be so close to the rear surface 51 that a heavy jar such as caused by forcibly slamming the door might split the member 50. Accordingly, the mounting member has been so formed as to permit the screws to be applied normal to the rear surface 51. This is done by providing the usual spaced portions 52 and 53 between which the pivot 54 for the keeper 55 extends, the spaced portions being connected by the portion 56 to which the keeper spring 57 is attached. The inner portion 52 is cut and shaped to provide wings 58 extending therefrom and terminating in feet 59 in which are located transversely extending screw slots 60 for the reception of the screws 61. The extra forming operation entailed may be compensated for by the fact that the slots 60 need not be countersunk for the reception of flat-head screws flush with the surface of the mounting portion, and the screws may be of any type such as the round-head screws illustrated. The thrust of the door on this form of the device is in the direction of the axes of the screws which is obviously sound construction. This form may be mounted upon a wide corner post or the like by appropriately mortising the inner corner of the post. Various other arrangements of the mounting member for special purposes should be readily apparent to skilled artisans.

In the form of the device illustrated in Figs. 24 to 26 inclusive there is shown a dual mounting whereby a pair of keepers may be so positioned as to retain oppositely hinged doors whose free edges are contiguous when the doors are closed. This form also illustrates a mounting member adapted to be attached to the top or bottom of a shelf, specifically being illustrated as attached to the bottom of the shelf so as to leave the entire top surface clear of obstructions. In this form the mounting member comprises an attaching portion 70 having at least one elongated slot 71 therein for the reception of a screw 72, which may be initially loosely applied so as to permit longitudinal adjustment of the mounting member by a trial closure of the doors, after which a second screw 73 may be affixed through a normal round hole firmly to retain the mounting member in adjusted position. The longitudinal edges of the portion 70 are bent downward to provide wings 74 which extend forward beyond the edge of the shelf 75. The forward edges of the wings 74 adjacent the portion 70 may be inwardly slotted as at 76 to provide sufficient passage for the guide portions of the latching members mounted upon the doors. The forwardly projecting tips of the wings 74 are rounded as indicated at 77 and the edges between the rounded tips and the back ends of the slots 76 are straight and horizontal so as to provide guideways to lift slightly sagging doors back to correct position. Also the lower edges of the forwardly projecting portions are preferably rounded rearwardly so that an upwardly sprung door may be forced to return to correct position. The distance between the opposite edges may increase rearwardly as illustrated, provided that the portion opposite the slot 76 is of such width as to be embraced by the guide and latch on the door in order positively to retain the separable members in latched position. This is indicated in skeleton outline by the portion 78 which is mounted upon one of the doors and the portion 79 mounted upon the other of the doors.

A pivot 80 extends between the wings adjacent their tips to provide means for mounting a pair of keepers 81, identical in all respects with the keeper previously described, which are mounted back to back upon the pivot 80 and are slightly spaced by a washer 82. The keepers are maintained in neutral position extending transversely to the direction of movement of the doors by springs 83 extending between ears on the keepers and a pair of notches 84 at the rear edge of the portion 70. Each keeper and spring operates exactly as previously described and each operates independently of the other. Therefore pressure on either door will permit its opening or closing, or the two doors may be opened or closed simultaneously if desired. It is obvious keepers may be mounted in multiples for any desired reason, for example, a large number thereof may be mounted side by side to retain narrow sliding racks. Also a single keeper may be mounted on a stamping of this type.

Having illustrated and described preferred embodiments of the invention in several forms it should be readily apparent to those skilled in the art that other modifications in arrangement and detail thereof may be achieved. All such modifications as come within the true spirit and scope of the appended claims are considered to be a part of my invention.

I claim:

1. In a latching device for a pair of relatively movable members, a latch adapted to be mounted on one of said members, said latch including a latch prong, a keeper mounting adapted to be mounted on the other of said movable members, a keeper pivotally mounted on said keeper mounting upon an axis normal to the direction of relative movement of said member, a spring tensioned between said keeper and keeper mounting and biasing said keeper to a neutral position transversely of the direction of relative movement of said members, said keeper being pivotally movable in either direction against the force of said spring in a plane parallel to said direction of relative movement and comprising a shoulder abutment facing away from the pivoted end thereof and a projecting lip at each side of said abutment, said latch prong being engageable with said keeper upon relative closing movement of said members to swing said keeper in the direction of closing movement until said prong passes beyond the lip at the engaged side whereupon said spring may return said keeper toward said neutral position, said keeper comprising means engageable with said prong to limit returning movement of said keeper under the influence of said spring whereby upon subsequent opening movement of said members to a slight extent said prong engages behind said shoulder abutment to restrain said members in latched position, said prong upon subsequent relative closing movement of said members beyond said latched position disengaging said shoulder abutment and permitting said spring to return said keeper to neutral position whereupon said members may be separated.

2. The structure set forth in claim 1; wherein said keeper mounting comprises a guiding portion having parallel side edges and a rounded front edge, and said latch comprises a second prong transversely spaced from said latch prong, said prongs being so positioned as to embrace said guiding portion.

3. The structure set forth in claim 1; wherein said keeper mounting includes spaced keeper supporting portions, one of said portions having substantially parallel edges extending in the direction of movement of said relatively movable members and defining guideways, and said latch includes a guide prong laterally spaced from and movable with said latch prong, said guide prong and said latch prong being so positioned that they embrace said parallel edges when said relatively movable members are in proximity to said latched position.

4. In a latching device for a pair of relatively movable members, a latch part adapted to be mounted on one of said members and including a pair of prongs, and a keeper part adapted to be mounted on the other of said members and including a pivotally mounted keeper and a guiding portion embraced by said prongs when said members are brought together, said keeper normally maintaining a neutral position extending transversely of the direction of relative movement of said members, said keeper being pivotally movable in either direction of relative movement in a plane parallel to said direction of relative movement and comprising a shoulder abutment facing away from the pivoted end thereof and a stop portion spaced outwardly from said shoulder abutment, said prongs and said keeper being so positioned that upon relative closing movement of said members one of said prongs engages a side of said shoulder abutment and swings said keeper in the direction of closing movement until said one prong passes beyond said shoulder abutment and engages said stop portion whereby upon subsequent opening movement of said members to a slight extent said prong engages the face of said shoulder abutment to restrain said members in latched position, said one prong upon subsequent relative closing movement of said members beyond said latched position disengaging said shoulder abutment and permitting said keeper to return to neutral position whereupon said members may be separated.

5. In a latching device for a pair of relatively movable members, a latch part adapted to be mounted on one of said members and including a latch having transversely spaced prongs, and a keeper part adapted to be mounted on the other of said members and including a pivotally mounted keeper, a pivot therefor, and a movement limiting and guiding portion independent of said keeper supporting said keeper and engageable between said prongs when said members are brought together, a spring normally maintaining said keeper in a neutral position extending transversely of the direction of relative movement of said members, said keeper being pivotally movable in either direction of relative movement in a plane parallel to said direction of relative movement and comprising a shoulder abutment facing away from the pivoted end thereof and a stop spaced from the face of said shoulder abutment, said latch and said keeper being so positioned that, upon relative closing movement of said members, one of said prongs swings said keeper in the direction of closing movement to move said keeper to a position such that said one prong engages said stop, whereby upon subsequent opening movement of said members to a slight extent said prong and said keeper are relatively guided toward positions in which said one prong engages the face of said shoulder abutment to restrain said members in latched position, said one prong upon subsequent relative closing movement of said members beyond said latched position disengaging said shoulder abutment and permitting said keeper to return to neutral position whereupon said members may be separated.

6. The structure set forth in claim 6; in which said keeper part includes portions supporting both ends of said pivot, one of said keeper supporting portions being provided with substantially parallel edges extending in the direction of movement of said members to form said guiding portion, said prongs being so positioned as to be closely adjacent the edges of said guiding portion when said members are in proximity to said latched position, the outer end of said one portion being rounded at the tip to cause self-alignment of said movable members when engaged by either of said prongs.

7. In a latching device for a pair of relatively movable members, a latch part adapted to be mounted on one of said members and including a pair of prongs, a keeper part adapted to be mounted on the other of said members and including a pivotally mounted keeper and a guiding portion embraced by said prongs when said members are brought together, said keeper normally maintaining a neutral position extending transversely of the direction of relative movement of said members, said keeper being pivotally movable in either direction of relative movement in a plane parallel to said direction of relative movement and comprising a shoulder abutment facing away from the pivoted end thereof and a stop portion spaced from said shoulder abutment, said prongs and said keeper being so positioned that upon relative closing movement of said members one of said prongs engages a side of said shoulder abutment and swings said keeper in the direction of closing movement until said one prong passes beyond said shoulder abutment and engages said stop portion, said stop portion thereupon relatively guiding said prong and keeper upon subsequent limited opening movement of said members to direct said prong into engagement with said shoulder abutment to restrain said members in latched position, said one prong upon subsequent relative closing movement of said members beyond said latched position disengaging said shoulder abutment and permitting said keeper to return to neutral position whereupon said members may be separated, and a spring tensioned between a fixed portion of said keeper part and a portion of said keeper in such relation to the axis of pivoting thereof that said keeper normally remains in said neutral position.

RALPH K. NOTTINGHAM.

REFERENCES CITED

The following references are of record in the file of this patent:

UNITED STATES PATENTS

| Number | Name | Date |
|---|---|---|
| 1,183,464 | Johnson | May 16, 1916 |
| 1,509,780 | Robertson | Sept. 23, 1924 |
| 1,578,041 | Knowlson et al. | Mar. 23, 1926 |
| 2,096,980 | Schjolin | Oct. 26, 1937 |

FOREIGN PATENTS

| Number | Country | Date |
|---|---|---|
| 388,106 | Great Britain | Feb. 23, 1933 |
| 482,889 | Great Britain | Apr. 4, 1938 |